United States Patent [19]

Nagashige et al.

[11] Patent Number: 5,313,588
[45] Date of Patent: May 17, 1994

[54] SCSI CONTROLLER AND METHOD FOR USE ON AN INFORMATION PROCESSING SYSTEM

[75] Inventors: Yukari Nagashige, Yokohama; Soichi Isono, Chigasaki; Kouzi Shida, Takasaki; Kunio Watanabe, Yokohama, all of Japan

[73] Assignee: Hitachi, Ltd., Tokyo, Japan

[21] Appl. No.: 921,743

[22] Filed: Jul. 30, 1992

[30] Foreign Application Priority Data

Jul. 30, 1991 [JP] Japan .................................. 3-190242
Aug. 20, 1991 [JP] Japan .................................. 3-207801

[51] Int. Cl.$^5$ ............................................ G06F 15/02
[52] U.S. Cl. .................................................. 395/275
[58] Field of Search ...................... 395/275; 364/238.3, 364/240.5, 926.9, 221.7, 230.2, 242.1, 939.6

[56] References Cited

U.S. PATENT DOCUMENTS 4,992,958  2/1991  Kageyama et al. .................. 395/275
5,079,692  1/1992  Takeda ................................. 395/275

Primary Examiner—Dale M. Shaw
Assistant Examiner—Moustafa Meky
Attorney, Agent, or Firm—Antonelli, Terry, Stout & Kraus

[57] ABSTRACT

An SCSI controller LSI comprising a CPU, command FIFO memories, a sequencer and a status register. The command FIFO memories store two commands issued consecutively by the CPU. The sequencer initially processes the first command, places a normal end code in the status register upon normal end of the command execution, and outputs a normal end interrupt set signal. At this point, a command indication bit for indicating the presence of an unexecuted bit is set. Then an AND gate inhibits the normal end interrupt set signal, and no interrupt signal is output. After the processing of the second command, the command indication bit is reset. This causes an interrupt signal to be output to the CPU. Thus when the first of the two consecutively issued commands ends normally, a normal end report to the CPU is omitted, and the interrupt signal for notifying the CPU of the normal end of command execution is inhibited.

20 Claims, 13 Drawing Sheets

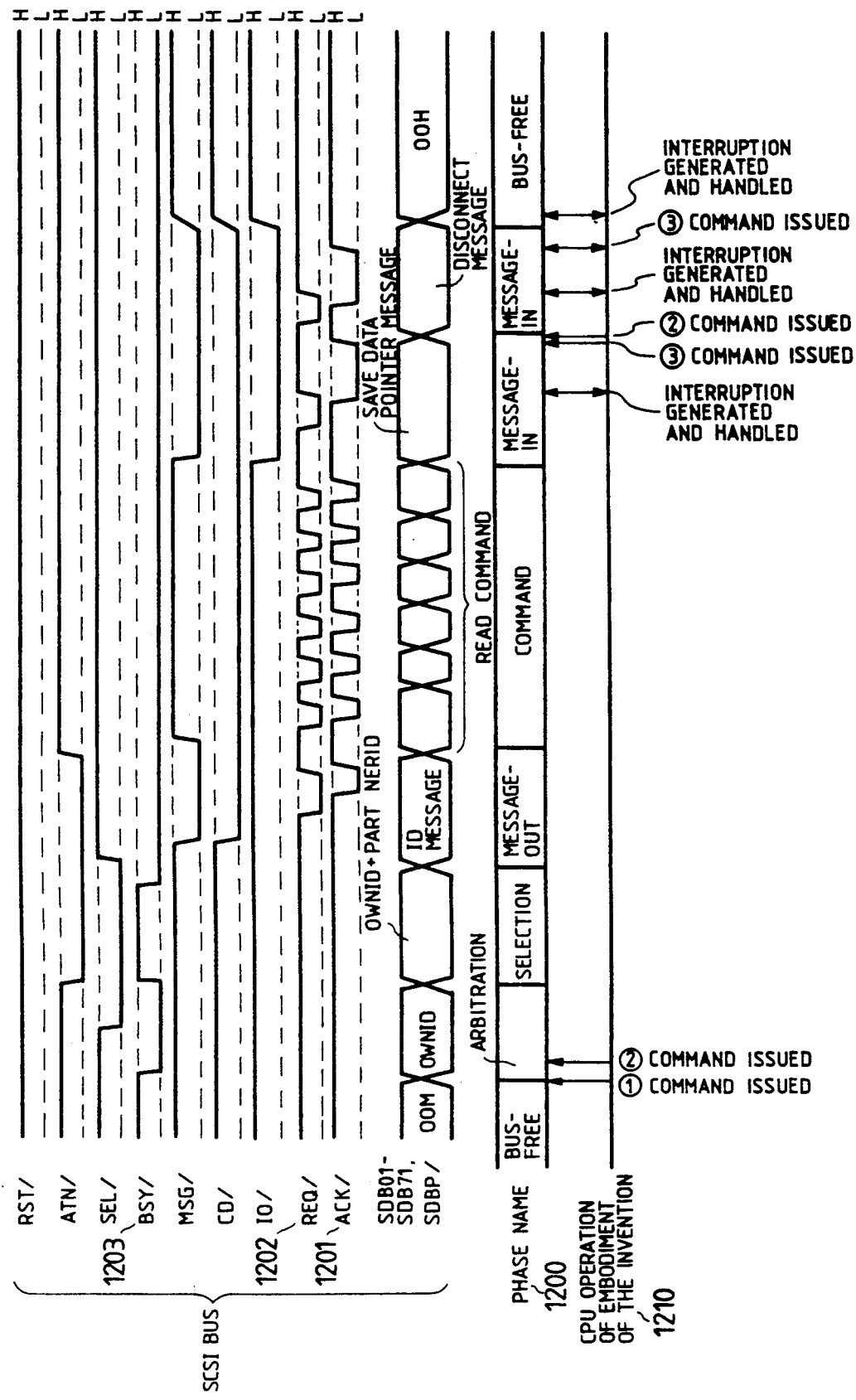

SCSI CONTROLLER AND METHOD FOR USE ON AN INFORMATION PROCESSING SYSTEM

BACKGROUND OF THE INVENTION AND RELATED ART:

The present invention relates to an SCSI (Small Computer System Interface) system and an SCSI controller LSI for controlling the SCSI system.

Heretofore, SCSI controllers have been used extensively to interface devices constituting a small-scale information processing system. FIG. 8 shows a typical system configuration utilizing an SCSI setup. The SCSI (ANSI X3T131-1986) is a collection of interface standards stipulated by the ANSI (American National Standards Institute) to interface personal computers, workstations and their peripherals. What is shown in FIG. 8 is a parallel interface system for data interchange using an SCSI bus 820 comprising nine control buses and nine data buses. Up to eight SCSI-based devices may be configured. Data are exchanged between initiators (host computers) 801 through 803 on the one hand, and targets (peripherals) 804 through 808 on the other.

SCSI controllers 811 through 818 control the SCSI-based transmission of data between the devices connected to the SCSI bus. In many cases, the SCSI controllers 811 through 808 are furnished in the IC form such as LSI's.

FIG. 3 depicts a conventional SCSI controller LSI setup. In the figure, reference numeral 1 is a CPU-side internal bus; 2 is an SCSI-side internal data bus; 3 is a CPU connection bus; 4-1 is an SCSI data bus single end input signal; 4-2 is an SCSI data bus single end output signal; 4-3 is an SCSI control bus single end input signal; and 4-4 is an SCSI control bus single end output signal. A data FIFO (first-in, first out) memory 5 temporarily stores data transferred between the CPU and the SCSI controller to adjust the rate of data transfer therebetween. An internal register 6 accommodates the data provided by the CPU. A parity detector 7 checks for parity data that are input from the SCSI controller or from the MPU (microprocessor unit). Reference numerals 9-1 and 9-3 are SCSI bus receivers, and 9-2 and 9-4 are SCSI bus drivers. A sequencer 8 receives as its input signals the outputs from the internal register 6, parity detector 7 and receiver 9-3, and controls the SCSI bus operation according to the commands placed in command FIFO memories 13 and 14. Reference numeral 11 is an SCSI bus status signal which is output by the receiver 9-3 and which is input to the sequencer 8; 12 is a driver control signal which is output by the sequencer 8 for control over the driver 9-4; and 10 is an interrupt signal sent to the CPU. The command FIFO memories 13 and 14 hold up to two SCSI control commands that are set by the CPU. The FIFO memory 13 is a first-stage FIFO memory that accommodates the currently executing command; the FIFO memory 14 is a second-stage FIFO memory that stores a command waiting to be executed. Status FIFO memories 15 and 16 accommodate up to two results from command execution by the sequencer 8. The status FIFO memory 15 is a first-stage FIFO memory, and the FIFO memory 16 is a second-stage FIFO memory. Interrupt bits 17 and 18 are included in the status FIFO memories 15 and 16, respectively.

FIG. 11 illustrates operation timings of a typical conventional SCSI controller LSI. In FIG. 11, a command 1 is written to the first-stage command FIFO memory 13 by the CPU. A second command 2 from the CPU is written to the second-stage command FIFO memory 14. The sequencer 8 processes the command 1 held in the first-stage command FIFO memory 13. After processing, the sequencer 8 places the end status of the command 1 to the first-stage status FIFO memory 15, and loads the command 2 from the second-stage command FIFO memory 14 to the first-stage command FIFO memory 13. The sequencer 8 then starts processing the command 2 written in the first-stage command FIFO memory 13.

Once the sequencer 8 has placed the end status of the command 1 in the first-stage status FIFO memory 15, an interrupt signal 10 is output to the CPU. On completing the processing of the command 2, the sequencer 8 places the end status of the command 2 into the second-stage status FIFO memory 16. Upon receipt of the interrupt signal 10, the CPU reads the end status of the command 1 from the first-stage status FIFO memory 15, thereby knowing the result of execution of the previously issued command 1. This prompts the end status of the command 2 held in the second-stage status FIFO memory 16 to be loaded into the first-stage status FIFO memory 15. With the end status of the command 2 loaded into the first-stage status FIFO memory 15, another interrupt signal 10 is output to the CPU. On receiving the second interrupt signal 10, the CPU reads the end status of the command 2 held in the first-stage status FIFO 15, thereby knowing the result of execution of the previously issued command 2. If the command 1 ends abnormally, the sequencer 8 generates an abnormal end interruption to the CPU and automatically clears the command 2.

Table 1 below lists typical commands that the CPU issues to the SCSI controller LSI. In the cable, the second column from left contains the commands and the rightmost column describes the operation specified by each command.

TABLE 1

| No. | Command Name | Operation |
|-----|--------------|-----------|
| 1 | Select With ATN Sequence | Execute the sequence "arbitration phase → selection phase → message-out phase → command phase." |
| 2 | Transfer Information | Exchange data in the phase indicated by the target upon initiation (or end with ACK/ asserted in the message-in phase). |
| 3 | Message Accepted | Negate ACK/. |

Below is an example of what takes place when an initiator issues a "Read" command to a target and disconnects for waiting to seek therefrom, with an SCSI controller LSI used as an SCSI adapter for the initiator. In the sequence of FIG. 12, phase transition starts in a bus-free phase, followed by an arbitration phase, a selection phase, a message-out phase, a command phase, a message-in phase and a bus-free phase, in that order. First, the CPU writes to the data FIFO memory 5 transmit data such as "Read" command data for transmission to the target. The CPU then issues a "Select With ATN Sequence" command and a "Transfer Information" command (see Table 1) to the SCSI controller LSI. In turn, the sequencer 8 of the SCSI controller LSI executes the "Select With ATN Sequence" command to control the SCSI bus and run the arbitration phase, selection phase, message-out phase and command phase, in that order. After completing the command phase and negating an ACK/ signal 1201, the sequencer 8 outputs to the first-stage status FIFO memory 15 a code indicating a normal end, sets "1" to the interrupt bit 17, and outputs an interrupt signal 10 to the CPU.

The sequencer 8 then executes the "Transfer Information" command 200, receives one byte of data in the message-in phase, outputs to the second-stage status FIFO memory 16 a code indicating a normal end while asserting the ACK/ signal, and sets "1" to the interrupt bit 18. When the CPU reads the normal end status of the "Select With ATN Sequence" command, the normal status of the "Transfer Information" command held in the second-stage status FIFO memory 16 is loaded into the first-stage status FIFO memory 15. The value of the interrupt bit 18 is loaded into the interrupt bit 17, and another interrupt signal 10 is output to the CPU. When the CPU reads the normal status of the "Transfer Information" command, both the first-stage status FIFO memory 15 and the interrupt bit 17 are cleared, and the interrupt signal 10 is negated.

Next, the CPU reads the input data from the data FIFO memory 5. The CPU issues a "Message Accepted" command to clear the ACK/ signal 1201 in the message-in phase, and issues a "Transfer Information" command 2000 to receive the next one byte. The sequencer 8 executes the "Message Accepted" command, negates the ACK/ signal 1201, outputs to the first-stage status FIFO memory 15 a code indicating a normal end when a REQ/1202 signal is asserted by the target, sets "1" to the interrupt bit 17, and outputs an interrupt signal 10 to the CPU. The sequencer 8 executes the "Transfer Information" command, receives one byte of data in the message-in phase, outputs to the second-stage status FIFO memory 16 a code indicating a normal end while asserting the ACK/ signal 1201, and sets "1" to the interrupt bit 18.

When the CPU starts reading the normal end status of the "Message Accepted" command, the normal status of the "Transfer Information" command stored in the second-stage status FIFO memory 16 is loaded into the first-stage status FIFO memory 15. The value of the interrupt bit 18 is loaded into the interrupt bit 17, and another interrupt signal 10 is output to the CPU. When the CPU reads the normal status of the "Transfer Information" command, both the first-stage status FIFO memory 15 and the interrupt bit 17 are cleared, and the interrupt signal 10 is negated. In addition, the CPU issues a "Message Accepted" command to clear the ACK/ signal 1201 in the message-in phase.

The sequencer 8 executes the "Message Accepted" command, negates the ACK/ signal, outputs to the first-stage status FIFO memory 15 a code indicating a normal end when the target negates a BSY/ signal, sets "1" to the interrupt bit 17, and outputs an interrupt signal 10 to the CPU. When the CPU reads the normal end status of the "Message Accepted" command to verify the normal end thereof, both the first-stage status FIFO memory 15 and the interrupt bit 17 are cleared, and the interrupt signal 10 is negated.

As described, SCSI control sequences of the SCSI controller LSI are generally controlled by the CPU using combinations of general-purpose commands. Individual operation sequences are specified using combinations of a small number of general-purpose commands because using a different command for each SCSI operation sequence will amount to a very large number of commands as a whole. The commands listed in Table 1 are used in combination with other commands in implementing a plurality of SCSI control sequences.

Where conventional SCSI controllers are used, executing a sequence of issuing a "Read" command and receiving data from a target will require the CPU to effect five interruptions in response to five interrupt signals. Under control of conventional SCSI controllers, the CPU is notified of the end status of each and every command by interruption. This is because combinations of commands are used to specify the SCSI control sequences. The result is a large overhead stemming from the interruptions effected during SCSI protocol processing by the CPU.

On the other hand, specifying each SCSI control sequence with a single command will require using a large number of commands in total. The numerous commands will have to be processed by a sequencer of highly complex constitution.

Below is a description of how the conventional SCSI bus and the CPU operate in a sequence of receiving a two-byte message in the message-in phase stipulated by the SCSI protocol. In the message-in phase, if received data are not correct, the SCSI protocol stipulates that an ATN/ signal be asserted before the ACK/ signal is negated. It follows that the SCSI control command must end while the ACK/ signal is being asserted. It also means that the CPU must issue a command to negate the ACK/ signal after reading and verifying the data from the data FIFO memory 5. All this generally amounts to a large overhead in the message-in phase under the SCSI protocol.

FIG. 2 depicts operation sequences of SCSI bus control commands (10h, 12h). FIG. 5 shows a typical SCSI protocol sequence highlighting a portion of the timing chart of FIG. 12. Upon receipt of an interrupt signal 10 indicating the end of the preceding phase, the CPU reads the internal register 6 to verify a normal end, ascertains that the SCSI bus status is in the message-in phase, and issues an SCSI bus control command (10h). When no SCSI bus control command is input, the sequencer 8 waits for an SCSI bus control command to be input while on a path (21) in a state <12>. When the SCSI bus control command (10h) is issued, the sequencer 8 travels a path (22) to reach a state <13>. The sequencer 8 then checks an SCSI bus status signal 11. If, as a result of this check, an IO/ signal is found to be Low and the message-in phase to be in effect, the sequencer 8 travels a path (23) to reach a state <14>, receives a single transfer byte, and asserts the ACK/ signal. The sequencer 8 checks the parity detector 7 next to see if the parity code is normal. If the parity code is found to be normal, the sequencer 8 travels a path (24) to reach a state <15> in which to place a termination interrupt signal in the internal register 6, travels a path (25) to reach a state <16> in which to output an interrupt signal 10 to the CPU, and travels a path (26) to return to the state <12>.

On receiving the interrupt signal 10, the CPU reads the internal register 6 to verify a normal end, reads the message byte from the FIFO memory 5 to ascertain the normal value thereof, and issues an SCSI bus control command (12h). The sequence 8 travels a path (27) to reach a state <17> in which to negate the ACK/ signal. The sequencer 8 then travels a path (28) to reach a state <18> in which to check to see if the REQ/ signal is asserted. Passing through a path (29), the sequencer 8 stays in the state <18> until the REQ/ signal is asserted. Once the REQ/ signal is asserted, the sequencer 8 travels a path (30) to reach a state <19> in which to place a bus service interrupt signal in the internal register 6, and travels a path (31) to reach the state <16> in which to output an interrupt signal 10 to the CPU. The sequencer 8 then travels the path (26) to reach the state <12> again. Upon receipt of the interrupt signal 10, the CPU reads the internal register 6 to verify a normal end, checks to see if the SCSI bus is in the message-in phase, and issues an SCSI bus control command (10h). With the SCSI bus control command (10h) issued, the sequencer 8 travels the path (22) to reach the state <13>. The sequencer 8 then checks the SCSI bus status signal 11. If, as a result of the check, the IO/ signal is found to be Low and the message-in phase to be in effect, the sequencer 8 travels the path (23) to reach the state <14>, receives one-byte transfer data, and asserts the ACK/ signal. Next, the sequencer 8 checks the parity detector 7 to see if the parity code is normal. If the parity code is found to be normal, the sequencer 8 travels the path (24) to reach the state <15>, places a termination interrupt signal in the internal register 6, and travels the path (25) to reach the state <16> in which to output an interrupt signal 10 to the CPU. The sequencer 8 then travels the path (26) to return to the state <12>.

On receiving the interrupt signal 10, the CPU reads the internal register 6 to verify a normal end, reads the message byte from the FIFO memory 5 to ascertain the normal value thereof, and issues an SCSI bus control command (12h). The sequencer 8 travels the path (27) to reach the state <17> in which to negate the ACK/ signal. The sequencer 8 then travels the path (28) to reach the state <18> in which to check to see if the REQ/ signal is asserted. Passing through the path (29), the sequencer 8 stays in the state <18> until the REQ/ signal is asserted. Once the REQ/ signal is asserted, the sequencer 8 travels the path (30) to reach the state <19> in which to place a bus service interrupt signal in the internal register 6, and travels the path (31) to reach the state <16> in which to output an interrupt signal 10 to the CPU. The sequencer 8 then travels the path (26) to return to the state <12>.

As described, a conventional SCSI sequence requires carrying out four interruptions. The interrupt processing has thus turned out to be a major overhead in terms of SCSI protocol processing execution time. In addition, because command execution is terminated by negating the ACK/ signal in other than the message-in phase, it is impossible to generate an attention condition in a desired information transfer phase in order to request a message-out phase.

SUMMARY OF THE INVENTION

It is therefore an object of the invention to provide an SCSI controller LSI which, with the number of commands held down, reduces the overhead stemming from reports of the command execution end status from SCSI controllers during SCSI protocol processing by the CPU.

It is another object of the invention to provide a controlling method for lowering the overhead of the protocol processing performed by the CPU.

It is a further object of the invention to provide a circuit construction for generating an attention condition in any information transfer phase desired in order to request a message-out phase.

In achieving the foregoing and other objects of the present invention and according to one aspect thereof, there is provided an SCSI controller IC comprising: command storing means for storing at least two commands furnished; command processing means for consecutively executing the commands in the order in which the commands were stored in the command storing means; execution result reporting means for reporting to the outside the execution end status of any of the commands of which the command processing means has terminated the execution; determining means for determining if the command executed by the command processing means is the command last stored in the command storing means; and report inhibiting means for inhibiting the execution end status of the command executed by the command processing means from getting reported to the outside if the determining means has determined that the command executed by the command processing means is not the command last stored in the command storing means and if the execution end status of the command executed by the command processing means is normal. As mentioned, if the determining means has determined that the command executed by the command processing means is not the command last stored in the command storing means and if the execution end status of the command is normal, the report inhibiting means inhibits the execution end status of the command from getting reported to the outside. In other words, all but the last command stored in the command storing means are unaccompanied by a normal end report when executed normally; only the last command prompts a normal end report to be made after being normally executed. If any command ends abnormally, an abnormal end report is always issued. The invention provides the following major benefits:

The invention adds a sequence to negate an ACK/ signal to the processing sequence of commands that control the SCSI bus acting as an initiator. This arrangement suppresses an increase in the number of interruptions even where the preceding phase is the message-in phase.

The invention terminates, in the processing sequence of commands that control the SCSI bus acting as an initiator, the currently executing SCSI bus control command while the ACK/ signal for the last transferred byte is being asserted. This arrangement allows an ATN/ signal to be asserted while the ACK/ signal is being asserted in any information transfer phase desired. Thus an attention condition is generated in a desired information transfer phase.

The invention provides an SCSI controller LSI wherein the overhead stemming from reports of the command execution end status from SCSI controllers is reduced during the SCSI protocol processing performed by the CPU with no increase in the number of commands.

The invention requires only a single interruption instead of the conventional two in transferring one byte of data in the message-in phase. This approximately amounts to a 50 percent reduction in the SCSI protocol overhead in the message-in phase.

Furthermore, the invention generates an attention condition in a desired information transfer phase to request a message-out phase. By contrast, given the commands for controlling the SCSI bus that acts as an initiator, it is conventionally impossible to generate an attention condition in the command phase, status phase, data-in phase or data-out phase except upon occurrence of a parity error.

BRIEF DESCRIPTION OF THE DRAWINGS

FIG. 13 is a timing chart showing the relationship between a typical sequence of the SCSI bus according to the invention on the one hand, and the processing by the CPU on the other.

DETAILED DESCRIPTION OF PREFERRED EMBODIMENTS

Figure 8:
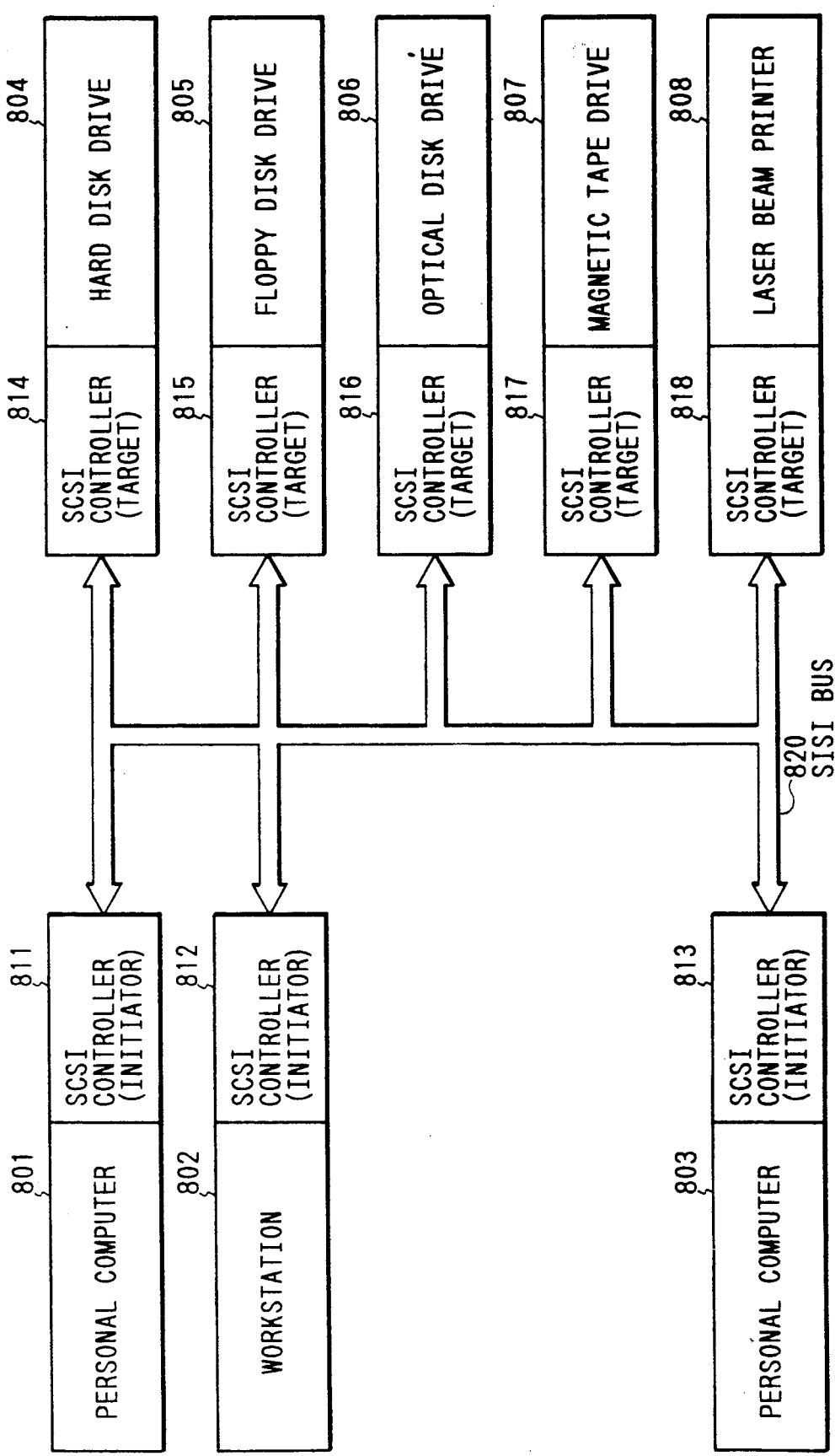
FIG. 8 is a view showing a typical SCSI-based system configuration.

Below is a description of an SCSI controller LSI embodying the invention. As mentioned, FIG. 8 shows a typical SCSI-based system configuration. In FIG. 8, reference numerals 801, 802, 803, 804, 805, 806, 807 and 808 are configured devices such as a computer, a disk drive and a printer; 820 is an SCSI bus; and 811, 812, 813, 814, 815, 816, 817 and 818 within the devices are each an SCSI controller LSI that embodies the invention.

The devices 801, 802 and 803 are computers that act as an initiator each in the SCSI setup. Other devices 804, 805, 806, 807 and 808 function as a target each in the SCSI setup. Each SCSI controller LSI controls the SCSI bus to enable data transmission between devices over the bus.

Figure 4:
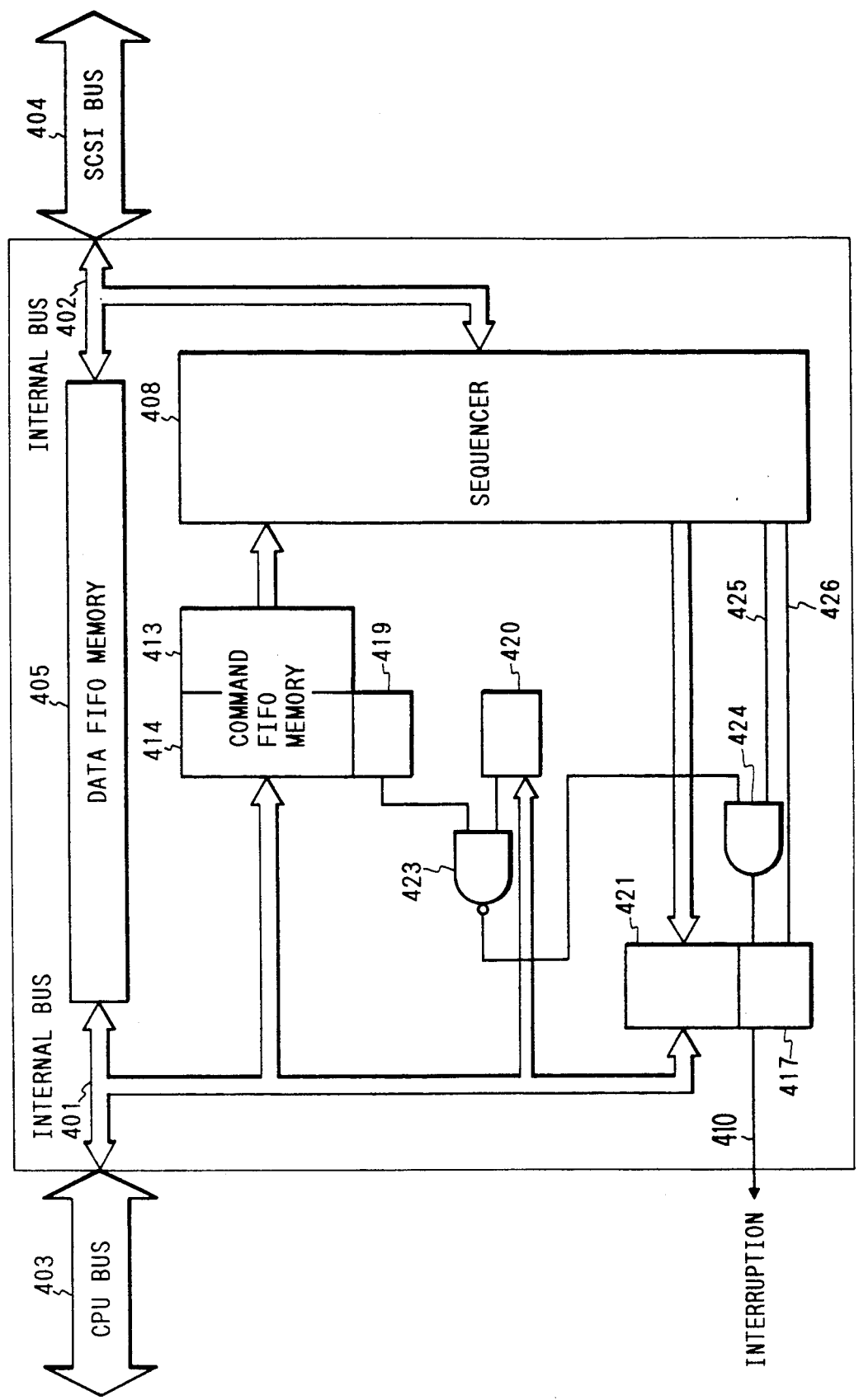
FIG. 4 is a block diagram of an SCSI controller embodying the invention.
Figure 5:
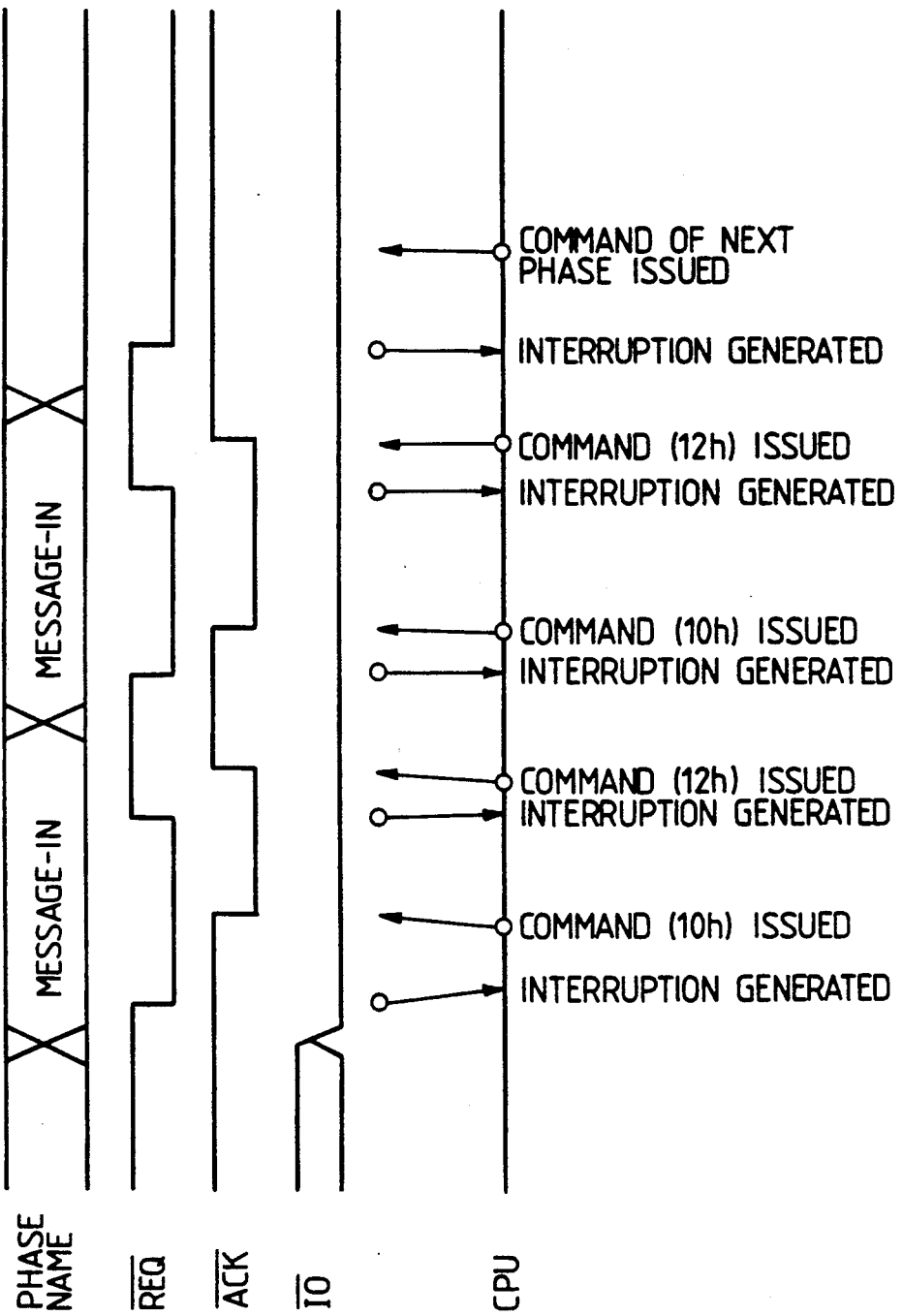
FIG. 5 is a view illustrating a typical prior art SCSI protocol sequence.

FIG. 4 is a block diagram of the SCSI controller according to the invention. In FIG. 4, reference numeral 401 is a CPU-side internal bus; 402 is an SCSI-side internal bus; 403 is a CPU bus; 404 is an SCSI bus; 405 is a data FIFO memory; 413 is a first-stage command FIFO memory; 414 is a second-stage command FIFO memory; 408 is a sequencer; and 410 is an interrupt signal.

A command presence indication bit 419 indicates whether a command exists in the second-stage command FIFO memory 414. An intermediate interrupt inhibit bit 420 inhibits the output of an interruption at the end of command execution if the first command has ended normally and if a second command exists in the command FIFO memory at the normal end of command execution. A status register 421 retains the end status of the command executed by the sequencer 408. The status register 421 acts as an independent status register when the intermediate interrupt inhibit bit 420 is set. If the intermediate interrupt inhibit bit 420 is not set, the status register 421 functions as part of a second-stage status FIFO memory 416, not shown, as does the first-stage status FIFO memory 15 in FIG. 3. An interrupt bit 417 retains an interruption. Reference numeral 423 is a NAND gate; 424 is an AND gate; 425 is a normal end interrupt set signal; and 426 is an abnormal end interrupt set signal.

How the inventive SCSI controller LSI works will now be described. If the intermediate interrupt inhibit bit 420 is not set, the SCSI controller LSI operates in the same manner as the SCSI controller LSI of FIG. 3. In that case, the status register 421 functions as part of the second-stage status FIFO memory 416, not shown, as does the first-stage FIFO memory 15 of the SCSI controller LSI in FIG. 3.

Figure 10:
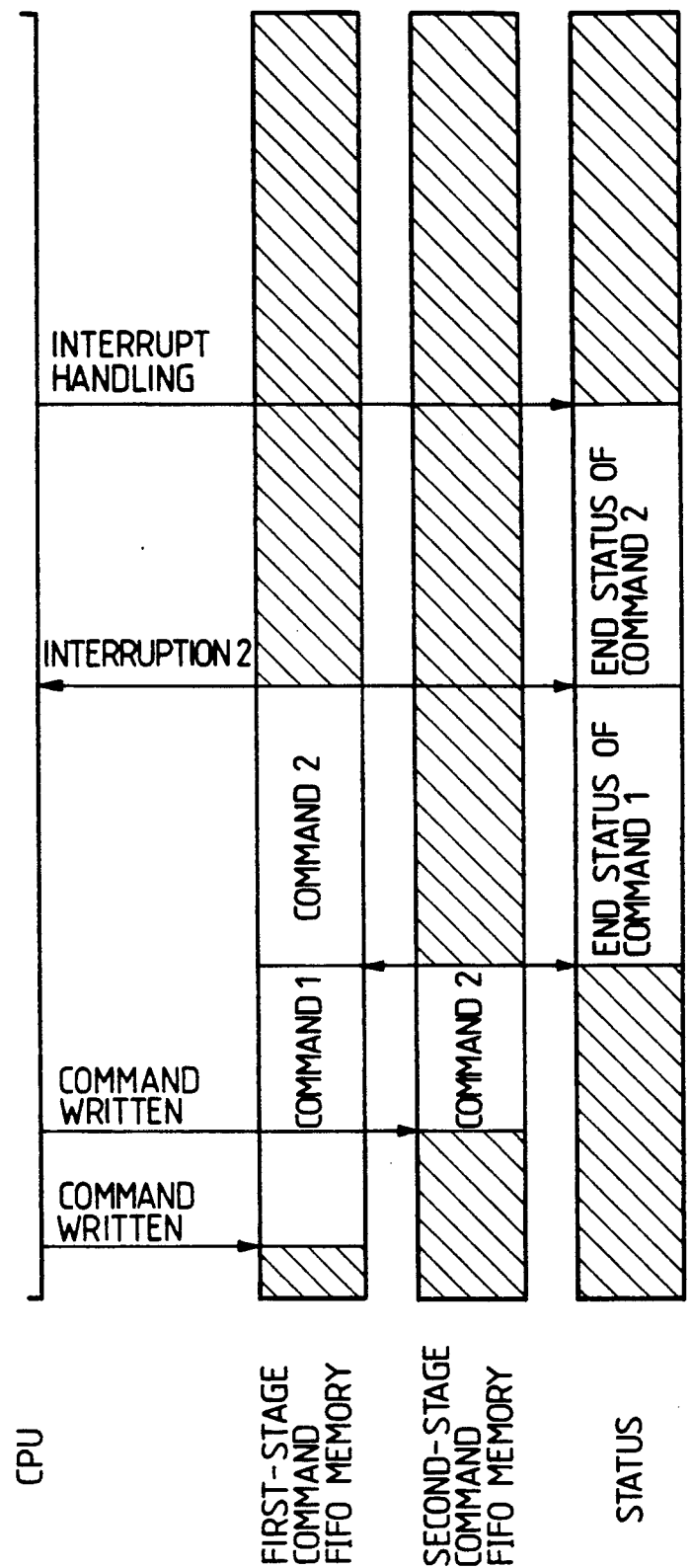
FIG. 10 is a timing chart representing the operation of the SCSI controller embodying the invention.
Figure 11:
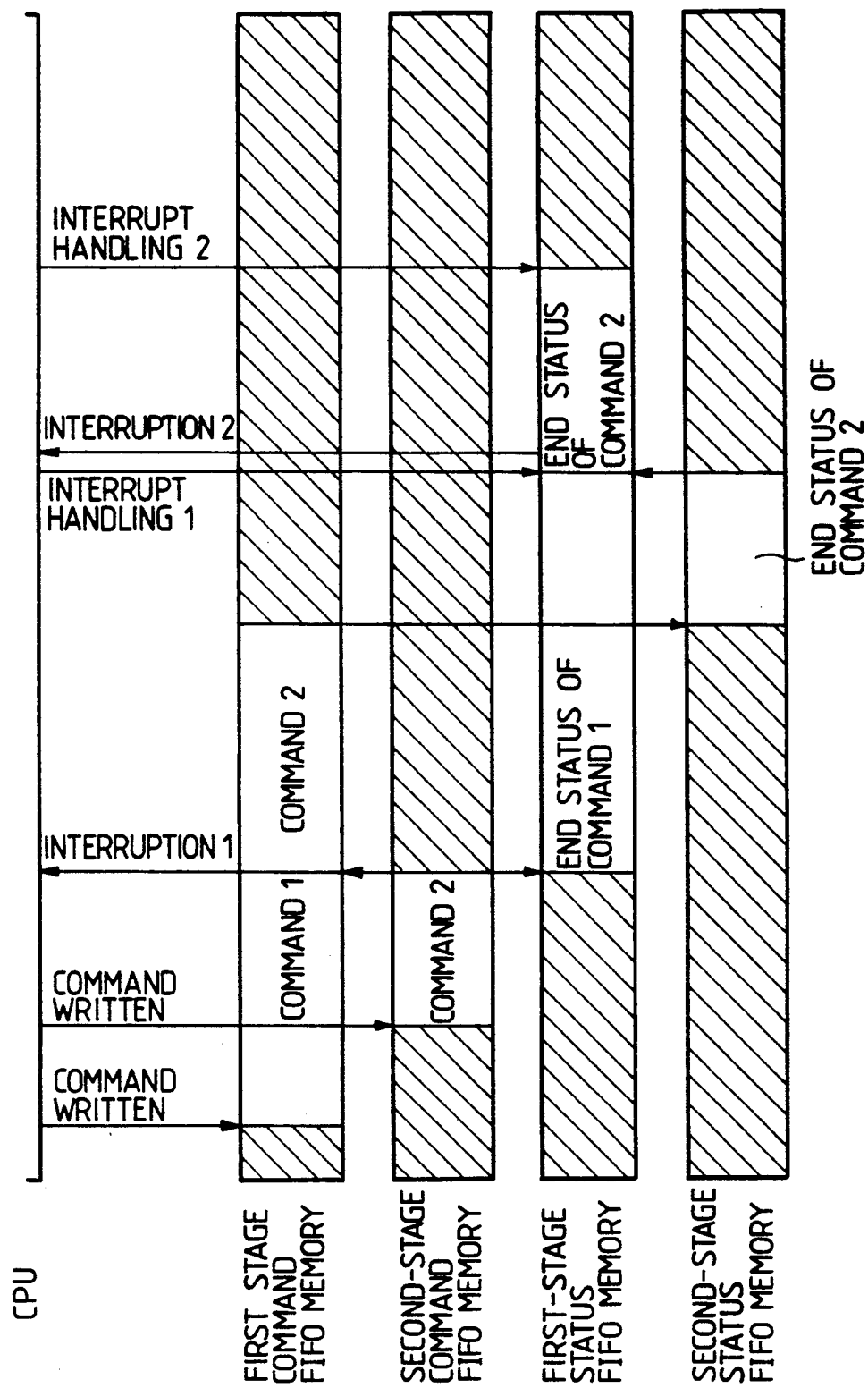
FIG. 11 is a timing chart representing the operation of a prior art SCSI controller.
Figure 12:
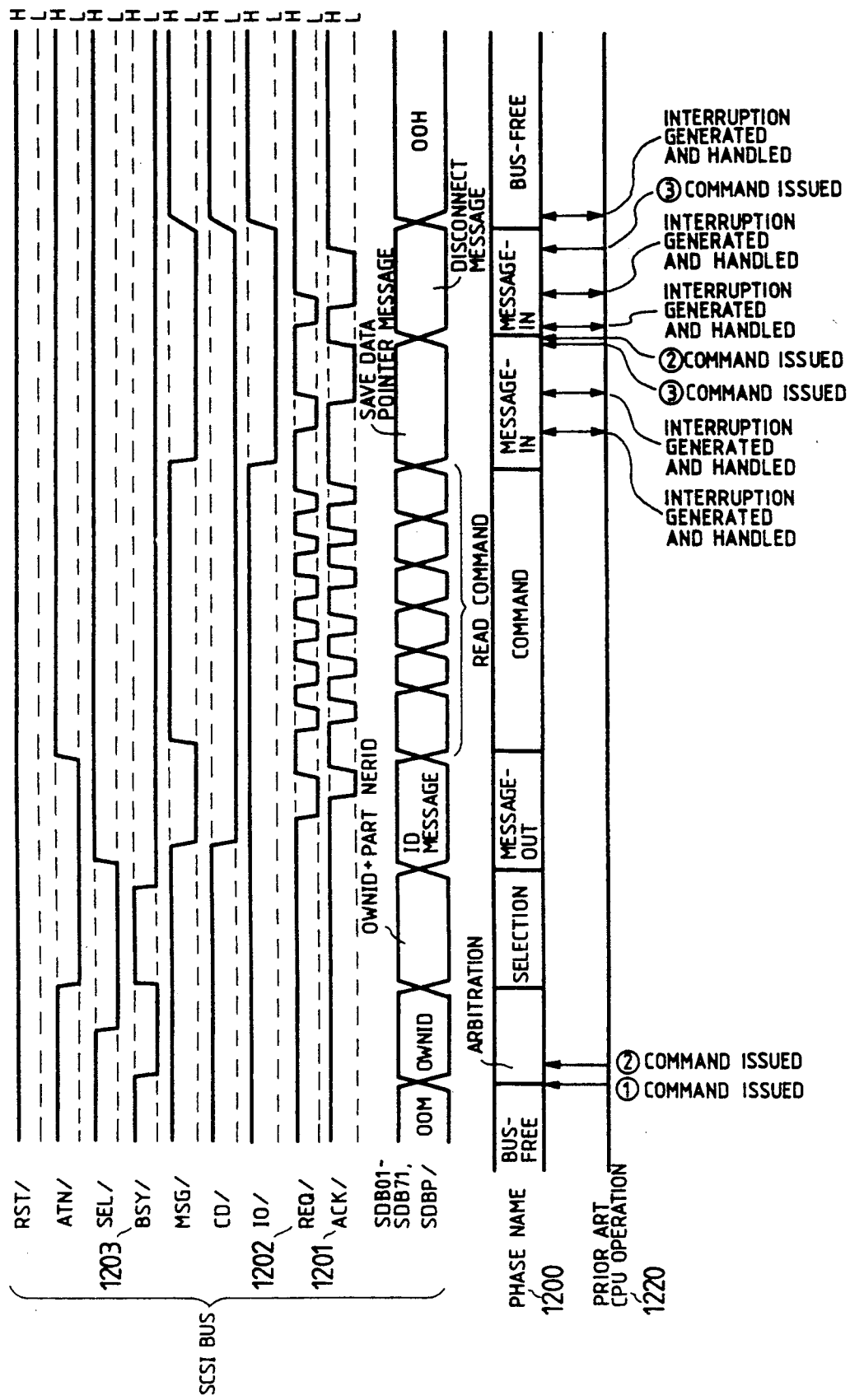
FIG. 12 is a timing chart indicating the relationship between a typical prior art sequence of the SCSI bus and the processing by the CPU.

If the intermediate interrupt inhibit bit 420 is set, the SCSI controller LSI operates according to the operation timings shown in FIG. 10. A command 1 is written to the first-stage command FIFO memory 413 by the CPU. The next command 2 from the CPU is written to the second-stage command FIFO memory 414. With the command written to the second-stage command FIFO memory 414, the command presence indication bit 419 is set. The sequencer 408 processes the command 1 written in the first-stage command FIFO memory 413. After the processing, the sequencer 408 places the end status of the command 1 into the status register 421, and issues a normal end interrupt set signal 425. At this point, when the end status of the command 1 is placed in the status register 421, the command presence indication bit 419 and the intermediate interrupt inhibit bit 420 inhibit the issuance of a normal end interrupt signal 425 and prevent the interrupt bit 417 from being set.

Next, the sequencer 408 loads the command 2 from the second-stage command FIFO memory 414 into the first-stage command FIFO memory 413, and starts processing the command 2 in the first-stage command FIFO memory 413. When the second-stage command FIFO memory 414 becomes empty, the command presence indication bit 419 is cleared.

After processing the command 2, the sequencer 408 places the normal end status of the command 2 into the status register 421, and issues a normal end interrupt set signal 425. With the processing of the command 2 terminated and with the end status of the command 2 loaded in the status register 421, the normal end interrupt set signal 425 is not inhibited because the command presence indication bit 419 is cleared. Thus the interrupt bit 417 is set, and an interrupt signal 410 is output to the CPU.

Upon receipt of the interrupt signal 410, the CPU reads the end status of the command 2 from a first-stage status register 421 to know the result of execution of the previously issued command 2. In case of an abnormal end of command execution, the sequencer 408 generates an abnormal end interruption to the CPU to clear the command automatically. At abnormal end, the abnormal end interrupt set signal 420 is not inhibited by the command presence indication bit 419 and intermediate interrupt inhibit bit 420. It follows that even when the command 1 ends abnormally, an interrupt signal 410 is output. This allows the CPU to deal with what caused the command to end abnormally.

Below is a description of how the SCSI controller LSI operates as an SCSI adapter of the initiator in a typical sequence in which the initiator issues a "Read"

command to the target and receives data therefrom. The description will be similar to that made in connection with the SCSI controller LSI of FIG. 3.

As described, phase transition in this sequence begins in a bus-free phase followed by an arbitration phase, a selection phase, a message-out phase, a command phase, a message-in phase and a bus-free phase, in that order. Signals on the SCSI bus occur as shown in FIG. 13. The same commands listed in Table 1 are also used in this example. To implement the sequence of FIG. 13, the CPU performs the operation numbered 1210 in FIG. 13.

The CPU initially sets the intermediate interrupt inhibit bit 420 of the SCSI controller LSI (see FIG. 4), writes to the data FIFO 405 "Read" command data or the like to be transmitted in the message-out phase and command phase, and issues a "Select With ATN Sequence" command and a "Transfer Information" command.

In the SCSI controller LSI, meanwhile, the "Select With ATN Sequence" command and the "Transfer Information" command issued by the CPU are placed in the first-stage and second-stage command FIFO memories 413 and 414, respectively. When a command is written to the second-stage FIFO memory 414, a "1" is set to the command presence indication bit 419.

The sequencer 408 executes the "Select With ATN Sequence" command in the first-stage command FIFO memory 413, and controls the SCSI bus to execute the arbitration phase, selection phase, message-out phase an command phase. With the command phase terminated, the sequencer 408 negates an ACK/ signal 1201 and ends the processing of the "Select With ATN Sequence" command. Thereafter, the sequencer 408 outputs to the status register 421 a code indicating a normal end, and outputs a normal end interrupt set signal 425 in pulse format.

Because the intermediate interrupt inhibit bit 420 is already set by the CPU, the command presence indication bit 419 and the intermediate interrupt inhibit bit 420 are both set to "1." It follows that the output of the NAND gate 423 is "0" and that the output of the AND gate 424 is not active. Thus the interrupt bit 417 is not set to "1," and the interrupt signal 410 is not output.

The "Transfer Information" command held in the second-stage command FIFO memory 414 is loaded into the first-stage command FIFO memory 413. With no command held in the second-stage command FIFO memory 414, the command presence indication bit 419 is cleared to "0." The output of the NAND gate 423 is thus "1."

The sequencer 408 executes the "Transfer Information" command loaded in the first-stage command FIFO memory 413, receives one-byte data in the message-in phase, places the one-byte data in the data FIFO memory 405, and terminates the processing of the "Transfer Information" command while asserting the ACK/ signal 1201. Then the sequencer 408 outputs a code indicating a normal end to the status register 421, and outputs a normal end interrupt set signal in pulse format. At this point, as mentioned above, the output of the NAND gate 423 is "1." Thus the output of the AND gate 424 is "1." A "1" is set to the interrupt bit 417, and an interrupt signal 410 is output.

On receiving the interrupt signal 410 for interruption, the CPU reads the value of the status register 421 to verify the normal end of command execution. When the CPU reads the value of the status register 421, the interrupt bit 417 is cleared, and the interrupt signal 410 is negated.

The CPU then reads the value of the data FIFO memory 405 and issues a "Message Accepted" command to clear the ACK/ signal in the message-in phase. The CPU proceeds to issue a "Transfer Information" command to receive the next one-byte data.

Meanwhile, in the SCSI controller LSI, the "Message Accepted" command and "Transfer Information" command issued by the CPU are placed into the first-stage and second-stage command FIFO memories 413 and 414, respectively. When a command is written to the second-stage command FIFO memory 414, a "1" is set to the command presence indication bit 419.

The sequencer 408 executes the "Message Accepted" command held in the first-stage command FIFO memory 413, negates the ACK/signal 1201, outputs a code indicating a normal end to the status register 421 when a REQ/ signal 1202 is asserted by the target, and outputs a normal end interrupt set signal 425 in pulse format. At this point, no interrupt signal 410 is output because the intermediate interrupt inhibit bit 420 is set and because the "Transfer Information" command is held in the second-stage command FIFO memory 414.

Meanwhile, the "Transfer Information" command stored in the second-stage command FIFO memory 414 is loaded to the first-stage command FIFO memory 413. With no command held in the second-stage command FIFO memory 414, the command presence indication bit 419 is cleared to "0," and the output of the NAND gate 423 is set to "1."

Then as with the above processing of the "Transfer Information" command, the sequencer 408 executes the "Transfer Information" command loaded in the first-stage command FIFO memory 413, receives one-byte data in the message-in phase, places the one-byte data in the data FIFO memory 405, and terminates the processing of the "Transfer Information" command while asserting the ACK/ signal 1201. Thereafter, the sequencer 408 outputs a code indicating a normal end to the status register 421, and outputs a normal end interrupt set signal in pulse format.

At this point, the output of the NAND gate 423 is set to "1" as mentioned above. It follows that the output of the AND gate 424 becomes "1." A "1" is set to the interrupt bit 417, and an interrupt signal 410 is output.

On receiving the interrupt signal 410 for interruption, the CPU reads the value of the status register 421 to verify the normal end of command execution. When the CPU reads the value from the status register 421, the interrupt bit 417 is cleared, and the interrupt signal 410 is negated.

The CPU reads from the data FIFO memory 405 the value received in the message-in phase. To clear the ACK/ signal in the message-in phase, the CPU issues a "Message Accepted" command. In the SCSI controller LSI, meanwhile, the "Message Accepted" command issued by the CPU is placed in the first-stage command FIFO memory 413.

The sequencer 408 executes the "Message Accepted" command held in the first-stage command FIFO memory 413, negates the ACK/signal 1201, outputs a code indicating a normal end when a BSY/signal 403 is negated by the target, and outputs a normal end interrupt set signal 425 in pulse format. At this point, the output of the NAND gate 423 is "1" because no command is held in the second-stage command FIFO memory 414. Thus the output of the AND gate 424 is "1." A "1" is set to the interrupt bit 417, and an interrupt signal 410 is output.

Upon receipt of the interrupt signal 410, the CPU reads the normal end status of the "Message Accepted" command to verify the normal end of command execution. When the normal end status is read out, the status register 421 and the interrupt bit 417 are cleared, and the interrupt signal 410 is negated.

If the command 1 ends normally, the sequencer 408 generates an abnormal end interrupt set signal 427, sets the interrupt bit 417, generates an interruption to the CPU, and clears automatically the command in the second-stage command FIFO memory 414. Because the abnormal end interrupt set signal 427 is not inhibited by the command presence indication bit 419 and intermediate interrupt inhibit bit 420, an interrupt signal 410 is output when the command ends abnormally. Thus the CPU can deal with any command issued that has ended abnormally.

This completes the sequence of the SCSI controller LSI in which the initiator issues the "Read" command to the target and receives data therefrom. As described, the embodiment of the invention allows the CPU to complete the above sequence by performing only three interruptions, compared with five interruptions that are conventionally required of the CPU. The commands used in the example above are the same as those of the prior art.

As described, if the first of the two commands issued consecutively by the CPU ends normally, the embodiment omits the operation of reporting the normal end of command execution. The normal end information about the first command is included in the end report of the second command. This arrangement reduces the number of times the CPU is interrupted and reduces the CPU overhead stemming from the interruptions from SCSI controllers. In case the first command ends abnormally, the abnormal end of command execution is reported to the CPU for error processing. The assumption is that, as described in the above sequence, where two commands are issued consecutively by the CPU, the first command usually ends normally and little processing by the CPU is needed for the normal end.

With this embodiment, the intermediate interrupt inhibit bit is set externally to specify the omission of normal end status report of the first command. If there exists processing that needs to be performed by the CPU in connection with the normal end of the first command, the embodiment does not omit the normal end status report of the first command.

With this embodiment, up to two commands are accepted continuously by the SCSI controller LSI. Alternatively, the SCSI controller LSI may accept three commands or more at a time. In such cases, the number of command FIFO memories to accommodate commands issued by the CPU is increased in keeping with the number of the commands. All but the last command accepted by the alternative embodiment are then processed in the same manner as the first command of the preceding embodiment. The last command of the alternative embodiment is processed in the same manner as the second command of the preceding embodiment.

Although the embodiments above are discussed from the viewpoint of practicing the SCSI controller LSI, the invention may also be applied to other peripheral IC's or LSI's that perform their processing based on CPU-issued commands and report the results.

Another embodiment of the invention will now be described with reference to FIGS. 1, 3, 6 and 9 as well as to Table 2 below. This embodiment is a more efficient version of the preceding embodiment.

Figure 1:
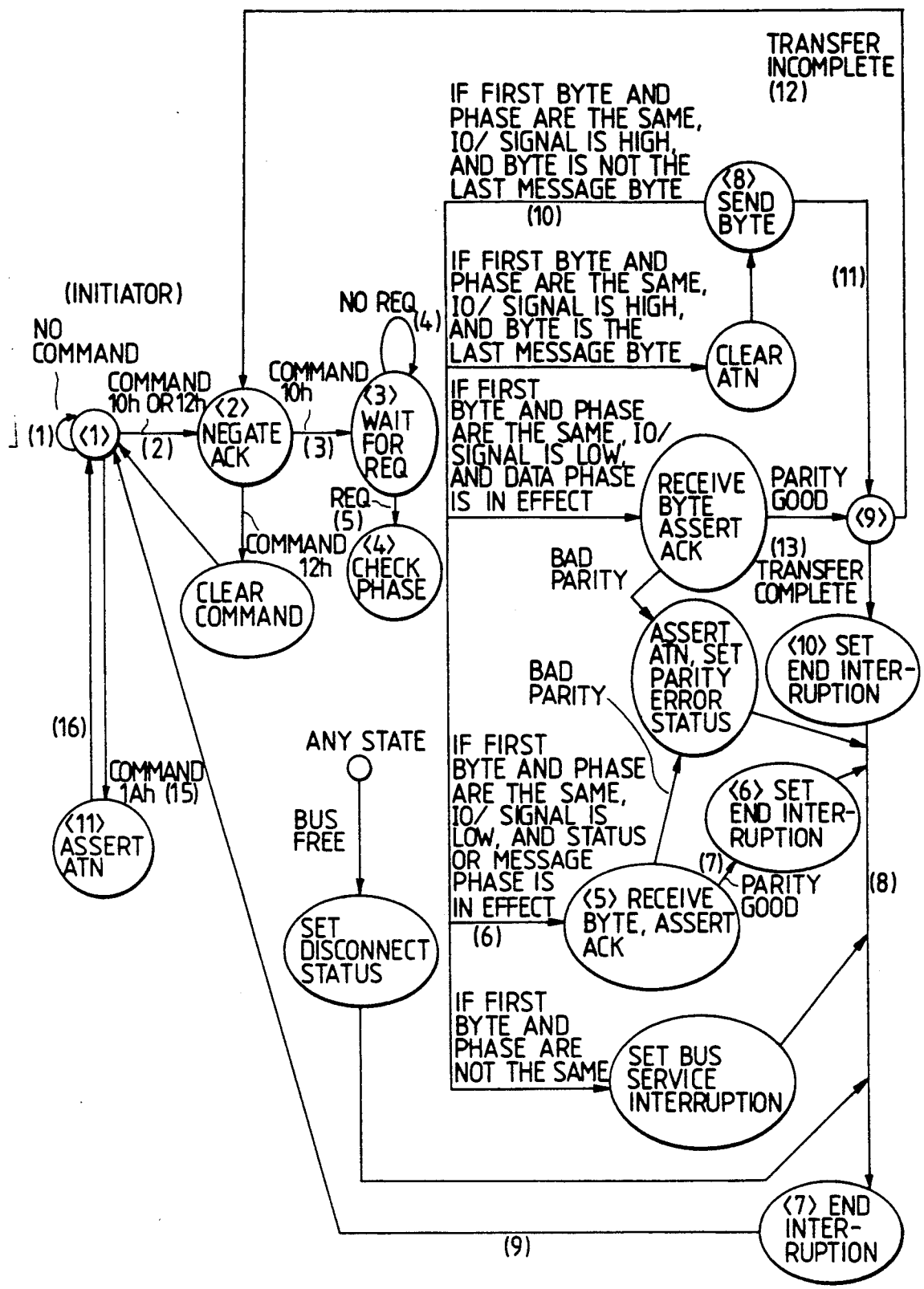
FIG. 1 is a view showing typical operation sequences of SCSI bus control commands (10h, 12h) for use with one embodiment of the invention.
Figure 2:
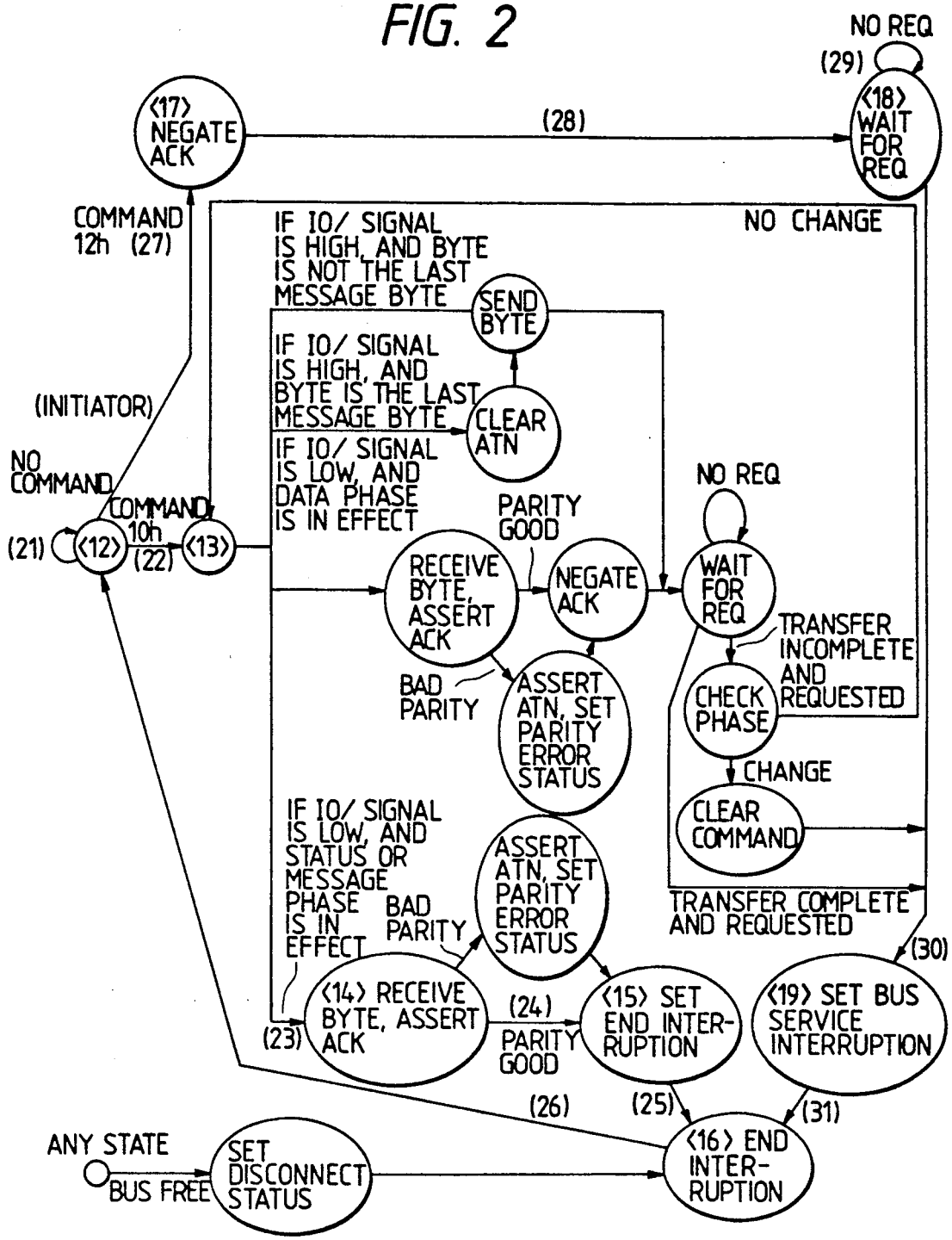
FIG. 2 is a view depicting conventional operation sequences of SCSI bus control commands (10h, 12h)
Figure 3:
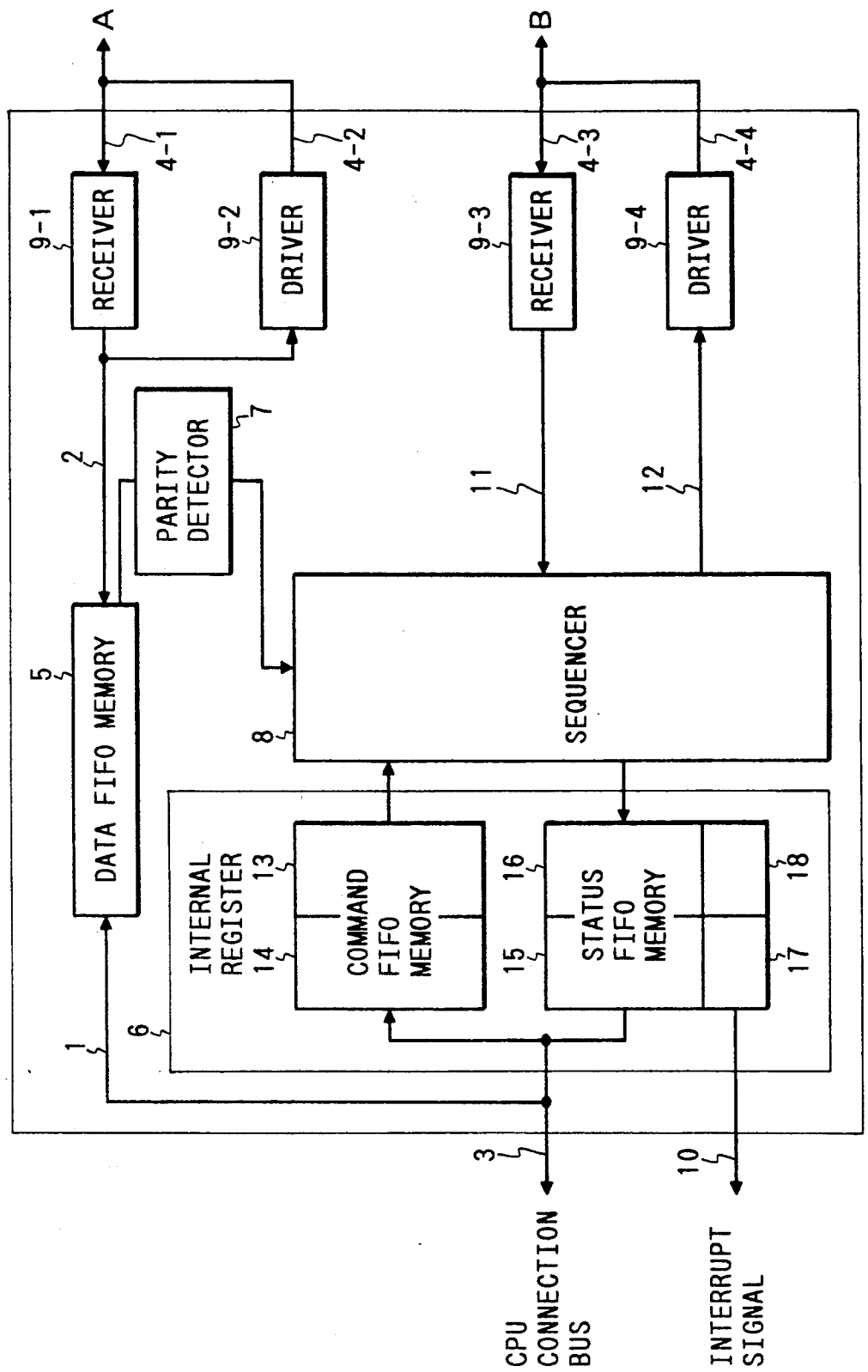
FIG. 3 is a block diagram of a prior art SCSI controller structure.
Figure 6:
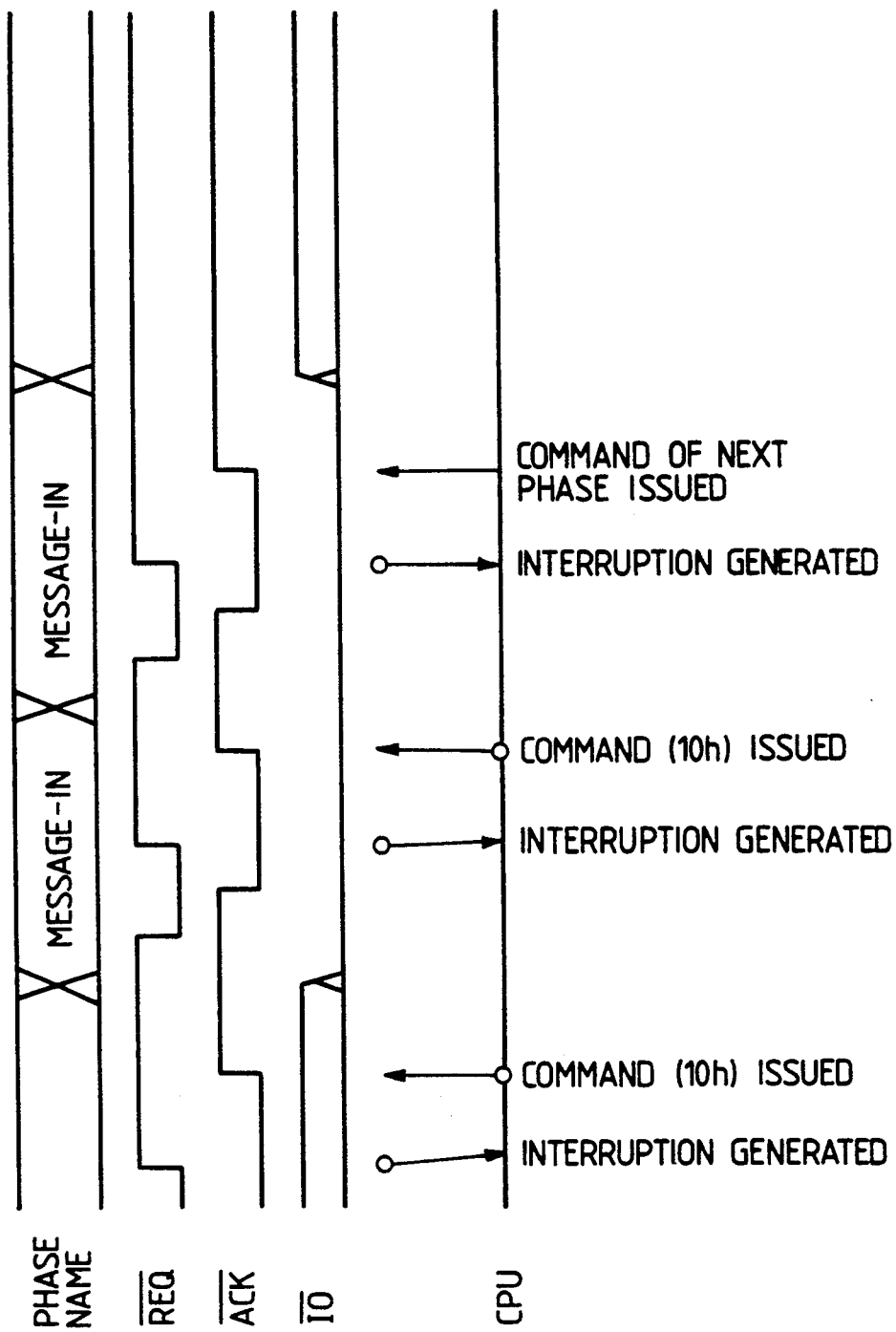
FIG. 6 is a view describing an SCSI protocol sequence according to the invention.
Figure 9:
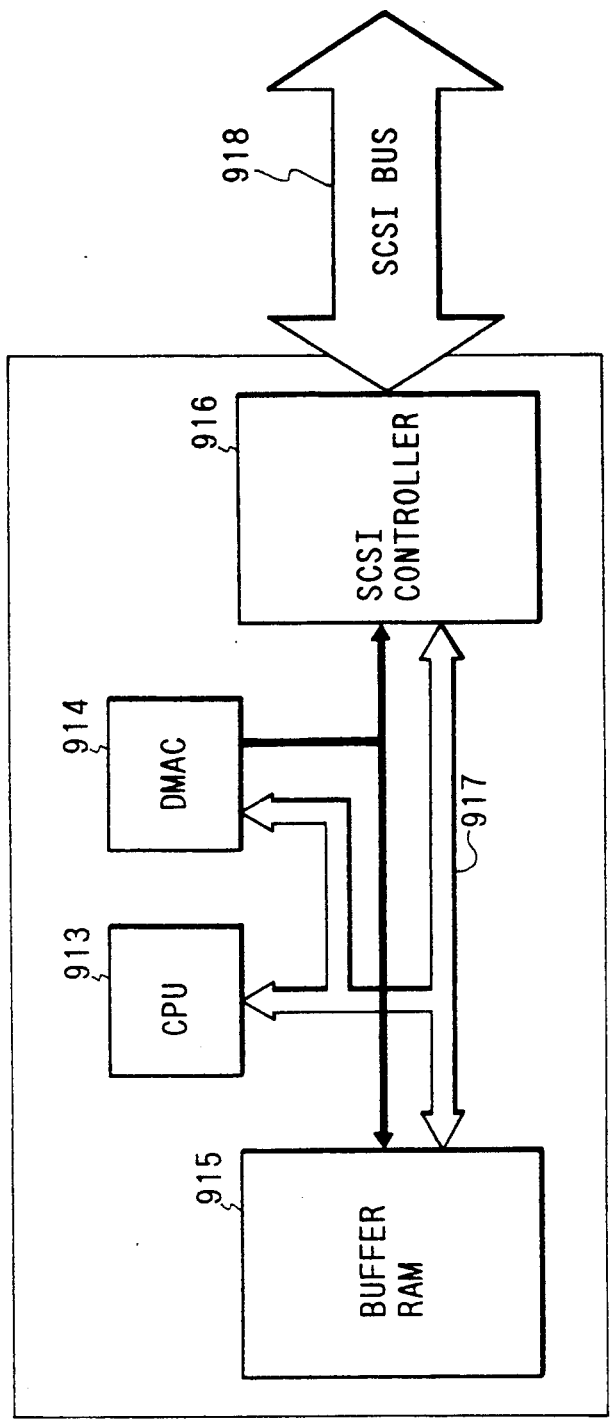
FIG. 9 is a view sketching an SCSI-based information processing system construction.

The basic construction of this embodiment is the same as that in the block diagram of FIG. 3. FIG. 9 shows a typical system construction of the embodiment. In FIG. 9, a CPU 913 and a DMA controller 914 control data exchanges between a buffer RAM 915 and an SCSI bus 918. FIG. 1 depicts typical operation sequences of SCSI bus control commands (10h, 12h) for use with this embodiment. FIG. 6 describes an SCSI protocol sequence in which the CPU operates according to the invention. Table 2 below lists the commands provided for use with this embodiment.

TABLE 2

| Command code | Description |
| --- | --- |
| 00 | Do nothing |
| 01 | Clear FIFO |
| 02 | Reset chip |
| 03 | Reset SCSI bus |
| 40 | Arbitration + re-selection + identify message |
| 41 | Arbitration + selection + command |
| 42 | Arbitration + selection + identify message + command |
| 43 | Arbitration + selection + identify message |
| 44 | Selected/re-selection awaited + identify message (+ command) |
| 45 | Selected/re-selection not awaited |
| 46 | Arbitration + selection + identify message + queue tag message + command |
| 20 | Transmit message in target mode |
| 21 | Transmit status in target mode |
| 22 | Transmit data in target mode |
| 23 | Disconnect after outputting two-byte message in target mode |
| 24 | Disconnect after outputting one status byte and one message byte in target mode |
| 25 | Output one status byte and one message byte in target mode |
| 27 | Disconnect in target mode |
| 28 | Receive one-byte message in target mode |
| 29 | Receive one-byte command in target mode |
| AA | Receive data of transfer counter length in target mode |
| 2B | Receive in target mode as many bytes of data as defined by SCSI protocol |
| 10 | Exchange bytes of information phase in initiator mode |
| 90 | Exchange bytes of information phase by DMA in initiator mode |
| 11 | Receive message after receiving status in initiator mode |
| 12 | Negate ACK signal |
| 1A | Assert ATN signal |

Note: Descriptions in parentheses apply only in the selected state.

Below is a description of how the general SCSI sequences mentioned earlier are implemented illustratively by the embodiment. FIG. 6 highlights a portion of what is shown in FIG. 13. As depicted in FIG. 6, on receiving an interrupt signal 10 indicating the end of the preceding phase, the CPU reads the internal register 6 to verify that command execution has ended normally, and issues an SCSI bus control command (10h). As illustrated in FIG. 1, the sequencer 8 of this embodiment waits while on a pass (1) for the input of a command in a state <1> where an SCSI bus control command is yet to be input. When the SCSI bus control command (10h) is issued, the sequencer 8 travels a path (2) to reach a state <3> in which to negate an ACK/ signal. Given the input command (10h), the sequencer 8 travels a path (3) to reach a state <3> in which to check a REQ/ signal using an SCSI bus status signal 11.

With the REQ/ signal held negated, the sequencer 8 travels a path (4) to stay in the state <3> in which to wait for the REQ/ signal to be asserted. When the REQ/signal is asserted, the sequencer 8 travels a path (5) to reach a sate <4>. Then the sequencer 8 checks the SCSI bus status signal 11 to find that a message-in phase is in effect. When an IO/ signal is Low in a message phase, the sequencer 8 travels a path (6) to reach a state <5>, receives one transfer byte, and asserts the ACK/signal. A parity detector 7 is checked for parity code verification. If the parity code is normal, the sequencer 8 travels a path (7) to reach a state <6> in which to place an end interruption in the internal register 6, and travels a path (8) to reach a state <7> in which to output an interrupt signal 10 to the CPU. The sequencer 8 then travels a path (9) to return to the state <1>.

Upon receipt of the interrupt signal 10, the CPU reads the internal register 6 to verify the normal end of command execution, reads a message byte from the FIFO memory 5 to verify the value thereof, and issues an SCSI bus control command (10h). When the SCSI bus control command (10h) is issued, the sequencer 8 of this embodiment travels the path (2) to reach the state <2> in which to negate the ACK/signal, as depicted in FIG. 1. Given the input command (10h), the sequencer 8 travels the path (3) to reach the state <3> in which to check the REQ/ signal using the SCSI bus status signal 11. With the REQ/ signal held negated, the sequencer 8 travels the path (4) to stay in the state <3> in which to wait for the REQ/ signal to be asserted. When the REQ/signal is asserted, the sequencer 8 travels the path (5) to reach the state <4>. The sequencer then checks the SCSI bus status signal 11 to find that the message-in phase is in effect. If the IO/ signal is Low in the message phase, the sequencer 8 travels the path (6) to reach the state <5> in which to receive one transfer byte and to assert the ACK/ signal. The sequencer 8 then checks the parity detector 7. If the parity code is found to be normal as a result of the check, the sequencer 8 travels the path (7) to reach the state <6>, places an end interruption into the internal register 6, travels the path (8) to reach the state <7> in which to output an interrupt signal 10 to the CPU, and travels the path (9) to return to the state <1>.

On receiving the interrupt signal 10, the CPU reads the internal register 6 to ascertain that command execution has ended normally, reads a message byte from the FIFO memory 5 to verify the value thereof, and issues a control command of the next phase.

This is how the sequence previously described in connection with the first embodiment is carried out by the CPU of this embodiment. The sequence is completed after the CPU has processed only two interruptions.

What follows is a description of a typical sequence in which this embodiment generates an attention condition in a command phase in order to request a message-out phase. The sequence will be described with reference to FIGS. 1 and 7.

Figure 7:
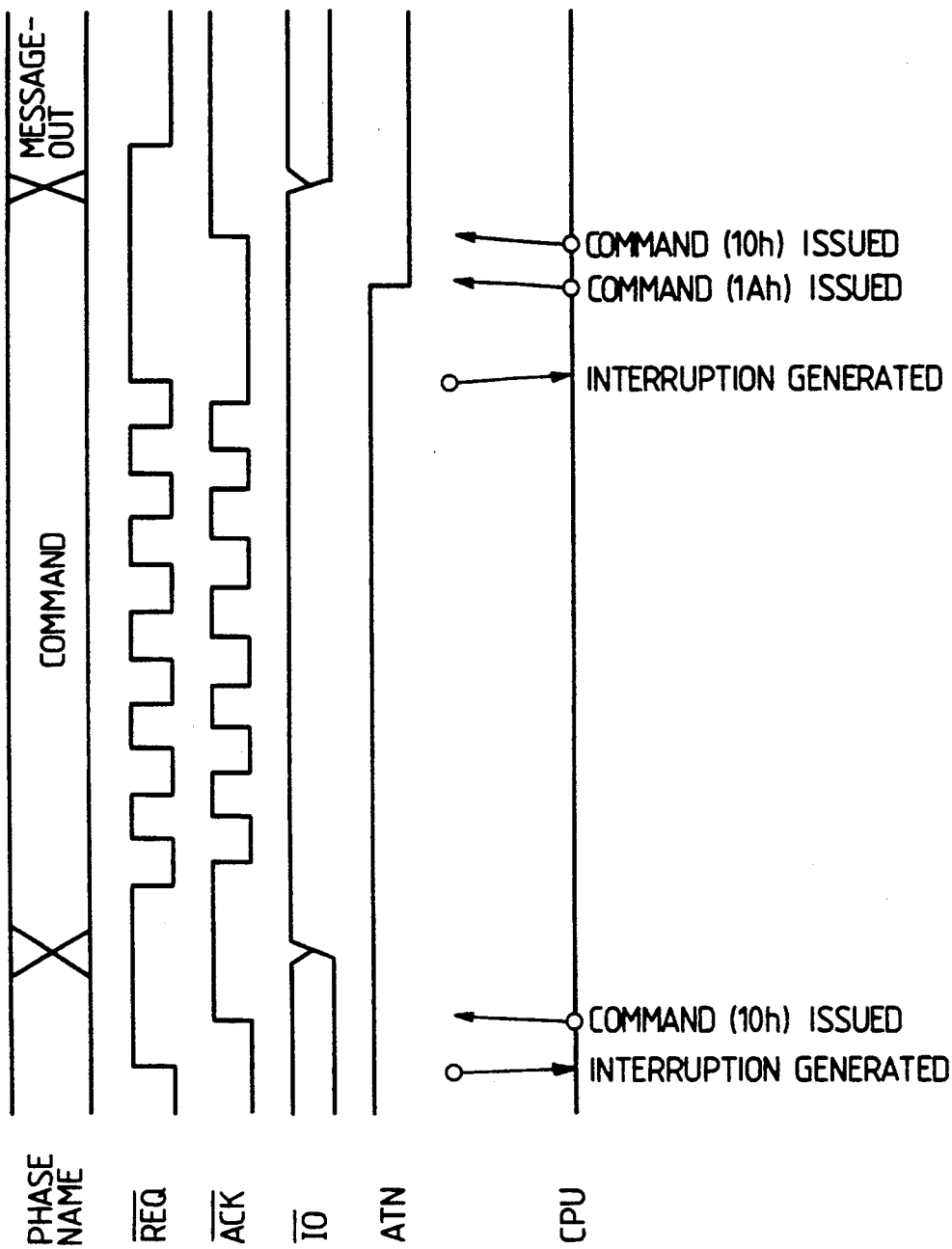
FIG. 7 is a view depicting another SCSI protocol sequence according to the invention.

As shown in FIG. 7, upon receipt of an interrupt signal 10 indicating the end of the preceding phase, the CPU reads the internal register 6 to verify the normal end of command execution, and issues an SCSI bus control command (10h). With the SCSI bus control command (10h) issued, the sequencer 8 of this embodiment travels the path (2) to reach the state <2> in which to negate the ACK/ signal, as depicted in FIG. 1. Given the input command (10h), the sequencer 8 travels the path (3) to reach the state <3> in which to check the REQ/ signal using the SCSI bus status signal 11. With the REQ/ signal held negated, the sequencer 8 travels the path (4) to stay in the state <3> in which to wait for the REQ/ signal to be asserted. When the REQ/ signal is asserted, the sequencer 8 travels the path (5) to reach the state <4>. The sequencer 8 then checks the SCSI bus status signal 11 to find that the command phase is in effect. When the IO/ signal is High in the command phase, the sequencer 8 travels a path (10) to reach a state <8> in which to transmit one transfer byte and to assert the ACK/ signal. The sequencer 8 then travels a path (11) to reach a state <9> in which to check the FIFO memory for any byte to be transmitted next. If the FIFO memory contains any byte to be transmitted, the sequencer 8 travels a path (12) to return to the state <2> in which to negate the ACK/ signal, and goes to the state <3> in which to wait for the REQ/ signal to be asserted again. Six bytes are transmitted in this manner. If the FIFO memory is found to be empty in the state <9>, the sequencer 8 travels a path (13) while asserting the ACK/ signal to reach a state <10> in which to place an end interruption into the internal register 6. The sequencer 8 then travels a path (8) to reach the state <7> in which to output an interrupt signal 10 to the CPU. The sequencer returns to the state <1> by passing through the path (9).

On receiving the interrupt signal 10, the CPU reads the internal register 6 to verify the normal end of command execution. When requesting a message-out phase, the CPU issues an SCSI bus control command (1Ah). With the SCSI bus control command (1Ah) issued, the sequencer 8 travels a path (15) to reach a state <11> in which to assert an ATN/ signal, as shown in FIG. 1. The sequencer then returns to the state <1> after passing through a path (16).

Next, the CPU enters a message-out phase, places into the FIFO memory the data to be transmitted, and issues an SCSI bus control command (10h). When the SCSI bus control command (10h) is issued, the sequencer 8 travels the path (2) to reach the state <2> in which to negate the ACK/ signal, as illustrated in FIG. 1. Given the input command (10h), the sequencer 8 travels the path (3) to reach the state <3> in which to check the REQ/ signal using the SCSI bus status signal 11. With the REQ/ signal held negated, the sequencer 8 travels the path (4) to stay in the state <3> in which to wait for the REQ/ signal to be asserted. When the REQ/ signal is asserted, the sequencer 8 travels the path (5) to reach the state <4>. The sequencer 8 then checks the SCSI bus status signal 11 to find that the message-out phase is in effect. When the IO/ signal is High in the message-out phase and when the FIFO memory contains at least two bytes, the sequencer 8 travels the path (10) to reach the state <8> in which to transmit one transfer byte and to assert the ACK/ signal.

As described and according to the invention, attention conditions may be generated in any desired information transfer phase including the command phase.

As many apparently different embodiments of this invention may be made without departing from the spirit and scope thereof, it is to be understood that the invention is not limited to the specific embodiments thereof except as defined in the appended claims.

What is claimed is:

1. A small computer system interface controller for executing a plurality of commands provided externally of said controller for control of a small computer system interface bus, said controller comprising:

command storing means for storing at least two commands that are provided externally;

command processing means for consecutively executing said commands in the order in which said commands were stored in said command storing means;

execution result reporting means for reporting externally the execution end status of any of said commands of which said command processing means has terminated execution;

determining means for determining if a command executed by said command processing means is the command last stored in said command storing means; and report inhibiting means for inhibiting the execution end status of the command executed by said command processing means from being reported externally if said determining means has determined that the command executed by said command processing means is not the command last stored in said command storing means and if said execution end status of said command executed by said command processing means is normal.

2. A small computer system interface controller according to claim 1, wherein said command storing means comprises first-in first-out memories for accommodating said plurality of commands, and wherein said determining means checks if, at the end of command execution by said command processing means, any unexecuted command exists in said first-in first-out memories in order to determine if the command executed by said command processing means is the command last stored in said command storing means.

3. A small computer system interface controller according to claim 1, further comprising:

report inhibition controlling means for determining if, based on externally furnished settings, said report inhibiting means is allowed to inhibit the reporting of the command execution end status externally.

4. A small computer system interface controller according to claim 3, further comprising:

a report inhibiting register for storing an externally furnished setting which provides the basis for determining if said report inhibiting means is allowed to inhibit said reporting of said execution end status externally;

wherein said report inhibition controlling means determines if, based on the setting of said report inhibiting register, said report inhibiting means is allowed to inhibit said reporting of said command execution end status externally.

5. A small computer system interface controller according to claim 1, wherein:

said execution result reporting means places the end result of the executed command in a status register provided for accommodating said end result and outputs an interrupt signal externally, thereby reporting said end status of said executed command externally; and said report inhibiting means inhibits said interrupt signal from being output externally, thereby inhibiting said execution result reporting means from reporting the command execution end status externally.

6. A small computer system interface controller according to claim 1, said controller comprises a semiconductor integrated circuit device.

7. A peripheral device for executing commands provided by a central processing unit, comprising:

command storing means for storing at least two commands provided by said central processing unit;

command processing means for executing said commands in the order in which said commands were stored in said command storing means;

execution result reporting means for reporting externally execution end status of a command at the end of execution of said command by said command processing means;

determining means for determining if a command executed by said command processing means is the last command stored in said command storing means; and reporting inhibiting means for inhibiting the execution end status of the command executed by said command processing means from being reported externally if said determining means has determined that the command executed by said command processing means is not the command last stored in said command storing means and if said execution end status of said command executed by said command processing means is normal.

8. A peripheral device according to claim 7, further comprising:

report inhibition controlling means for determining if, based on externally furnished settings, said report inhibiting means is allowed to inhibit the reporting of the command execution end status externally.

9. An information processing system for transmitting data using a small computer system interface bus, said system comprising:

a central processing unit for issuing a plurality of commands for controlling said small computer system interface bus;

command storing means for storing at least two commands provided by said central processing unit;

command processing means for executing said commands in the order in which said commands were stored in said command storing means;

execution result reporting means for reporting to said central processing unit execution end status of a command at the end of execution of said command by said command processing means;

determining means for determining if a command executed by said command processing means is the last command stored in said command storing means; and report inhibiting means for inhibiting the execution end status of the command executed by said command processing means from being reported to said central processing unit if said determining means has determined that the command executed by said command processing means is not the command last stored in said command storing means an if said execution end status of said command executed by said command processing means is normal.

10. An information processing system according to claim 9, wherein said command storing means comprises first-in first-out memories for accommodating said plurality of commands, and wherein said determining means checks if, at the end of command execution by said command processing means, any unexecuted command exists in said first-in first-out memories in order to determine if the command executed by said command processing means is the command last stored in said command storing means.

11. An information processing system according to claim 9, further comprising:

report inhibition controlling means for determining if, based on the setting furnished by said central processing unit, said report inhibiting means is allowed to inhibit the reporting of the command execution end status to said central processing unit.

12. An information processing system according to claim 11, further comprising:

a report inhibiting register for storing the setting which is furnished by said central processing unit and which provides the basis for determining if said report inhibiting means is allowed to inhibit said reporting of said command execution end status to said central processing unit;

wherein said report inhibition controlling means determines if, based on said setting of said report inhibiting register, said report inhibiting means is allowed to inhibit said reporting of said command execution end status to said central processing unit.

13. An information processing system according to claim 9, wherein:

said execution result reporting means places the end result of the executed command in a status register provided for accommodating said end result and outputs an interrupt signal to said central processing unit, thereby reporting said end status of said executed command to said central processing unit; and said report inhibiting means inhibits said interrupt signal from being output to said central processing unit, thereby inhibiting said execution result reporting means from reporting the command execution end status to said central processing unit.

14. An information processing system according to claim 9, wherein said command storing means, said command processing means, said execution result reporting means, said determining means and said report inhibiting means are constructed in a single semiconductor integrated circuit device.

15. An information processing system according to claim 9, further comprising:

means for negating, when said information processing system operates as an initiator, the ACK signal stipulated by the small computer system interface protocol at the start of executing the command provided by said central processing unit.

16. An information processing system according to claim 15, further comprising:

means for ending, when said information processing system operates as an initiator, execution of each command provided by said central processing unit while continuing to assert the ACK/ signal of the last transferred byte.

17. An information processing system according to claim 9, further comprising:

means for negating, where said information processing system operates as an initiator, an ACK/ signal the moment transition to the next phase becomes possible.

18. A small computer system interface controller controlling method for executing a plurality of externally provided commands for control of a small computer system interface bus, said method comprising the steps of:

storing at least two commands that are externally provided;

executing said commands in the order in which said commands were stored;

determining if an executed command is the command last stored; and reporting execution end status of said executed command externally unless said executed command is not the command last stored and unless said execution end status of said executed command is normal.

19. A small computer system interface controller controlling method according to claim 18, wherein said plurality of externally furnished commands are stored in first-in first-out memories, and wherein said determining step is performed by checking to see if any unexecuted command exists in said first-in first-out memories at the end of the execution of any of said commands.

20. A small computer system interface controller controlling method according to claim 18, wherein said reporting step is performed by placing the end result of the executed command in a status register provided for accommodating said end result and by outputting an interrupt signal externally;

said interrupt signal being inhibited from being output externally if said executed command is to the command last stored and if the execution end status of said executed command is normal.

* * * * *